US007796945B2

(12) United States Patent
Abbate et al.

(10) Patent No.: US 7,796,945 B2
(45) Date of Patent: Sep. 14, 2010

(54) METHOD AND SYSTEM FOR ASSOCIATING DEVICES IN A PERSONAL AREA NETWORK

(75) Inventors: Alain D. Abbate, Carol Springs, FL (US); Ukachi N. Achareke, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 1020 days.

(21) Appl. No.: 11/536,972

(22) Filed: Sep. 29, 2006

(65) Prior Publication Data

US 2008/0080407 A1 Apr. 3, 2008

(51) Int. Cl.
*H04B 7/00* (2006.01)
(52) U.S. Cl. ............... 455/41.2; 455/41.3; 455/456.1; 455/456.2; 370/310; 370/310.2; 370/338
(58) Field of Classification Search ............. 455/41.2, 455/414.2, 456.1, 456.2, 456.3, 41.3; 370/254, 370/310, 310.2, 338
See application file for complete search history.

(56) References Cited

U.S. PATENT DOCUMENTS

| | | | |
|---|---|---|---|
| 2004/0073795 | A1 | 4/2004 | Jablon |
| 2004/0203381 | A1 | 10/2004 | Cahn et al. |
| 2005/0043021 | A1 | 2/2005 | Roskind et al. |
| 2005/0198029 | A1 | 9/2005 | Pohja et al. |
| 2005/0201301 | A1* | 9/2005 | Bridgelall .................. 370/254 |
| 2006/0046664 | A1* | 3/2006 | Paradiso et al. .............. 455/96 |

FOREIGN PATENT DOCUMENTS

| | | | |
|---|---|---|---|
| WO | 2008042535 | A2 | 4/2008 |
| WO | 2008042535 | A3 | 4/2008 |

OTHER PUBLICATIONS

PCT International Preliminary Examination Report Application No. PCT/US2007/077073 Dated Apr. 9, 2009—8 Pages.
PCT International Search Report Application No. PCT/US2007/077073 Dated Mar. 6, 2008—8 Pages.

* cited by examiner

*Primary Examiner*—Tuan H Nguyen

(57) ABSTRACT

A method and system are provided for associating devices in a personal area network (PAN). Device association is initiated by applying a stimulus to two devices simultaneously, the timing of the stimulus identifying devices to be paired thereby eliminating the need for PINs and passcodes in pairing devices. Upon stimulation the devices record a timestamp (404) for the stimulus and begin searching (406) for other in-range devices with which they can associate. Upon finding an in-range device an association request (408) is sent containing the elapsed time since the stimulus was applied. The in-range device compares the received elapsed time against its internal elapsed time since receiving the stimulus (412) (416) to determine if the stimuli occurred simultaneously to both devices. If the stimuli were substantially simultaneous, then the devices form a PAN association (418).

19 Claims, 6 Drawing Sheets

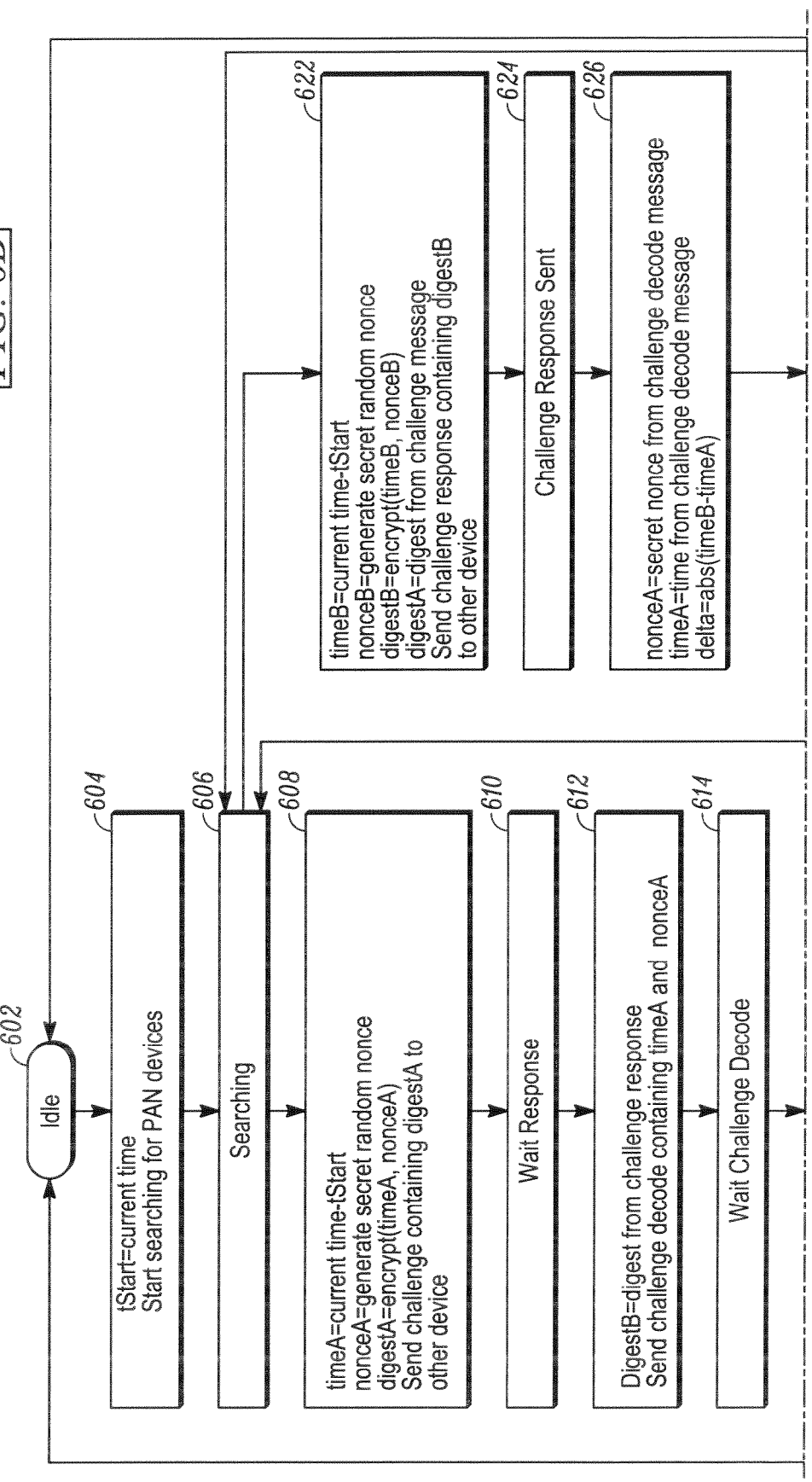

METHOD AND SYSTEM FOR ASSOCIATING DEVICES IN A PERSONAL AREA NETWORK

FIELD OF THE INVENTION

The present invention relates generally to electronic devices adapted to communicate over personal area networks and, more particularly, to a method and system for easily associating devices in a personal area network while excluding devices to which an association is not desired.

BACKGROUND

A personal area network ("PAN") consists of two or more devices wirelessly communicating with each other over a short distance, typically 10 meters or less. PAN devices are often mobile devices such as mobile radios, cell phones, head phones, laptops, sensors, and personal digital assistants (PDAs) for example. Each user may be thought of as having his or her own personal area network where two or more wireless devices are paired or associated for cooperative communication. The range of an individual PAN is limited, but if multiple PAN users are in the same room or general area then coverage areas of other user's PANs will overlap.

Within close proximity to a PAN user may be other users having, for example, cellular phones and wireless headsets. A problem arises in how a user is to associate a new PAN device with the correct PAN in a situation where the device is within range of more than one PAN. There are many known ways to form a PAN association between a new PAN enabled device and an existing PAN device such as a cellular phone or mobile radio. In the case of certain wireless PAN networks such as BLUETOOTH enabled devices, the user can initiate a discover mode on the cellular phone to find other nearby in-range PAN devices. Often the discovered devices are presented to the user on the device's display screen, where the user can then use the cursor or keypad to select the PAN device with which the user wants to form an association. The user may then be prompted to enter a personal identification number ("PIN") or a passcode to authenticate the device association and prevent unwanted device associations. Once authenticated, the BLUETOOTH protocol then establishes the communication channel between the two devices.

Known methods of associating or pairing devices in a personal area network have several disadvantages. One disadvantage is the requirement for a PIN or passcode to authenticate forming a device association. PIN codes and passcodes can be easily forgotten. Another disadvantage arises in that many PAN enabled electronic devices lack a keyboard or other means of entering a PIN or passcode directly on the device. An example of this might be a wireless headset. Another disadvantage arises in environments where mobile radios and PAN enabled devices are shared among many users such as in the public safety field. Shared PAN devices continually need to be re-associated depending upon who is using a particular mobile radio, cell phone, PDA, headset, etc. Known methods of associating PAN devices do not provide a means of quickly re-associating devices in such situations.

Other known methods of associating PAN devices include:

U.S. Patent Publication No. 2005/0201301, which discloses a self-associating wireless area network in which devices that should be added to a PAN are determined based upon device range and relative motion. This approach fails if the two PAN users are in range but are not moving relative to one another.

U.S. Patent Publication No. 2005/0198029 discloses a method of forming an ad hoc relationship between two devices wherein the devices enter a "hugging state" (touching or in close proximity) before forming the association. The method requires the two devices to exchange a handle by reading the RFID tag of the hugged device, requiring the devices to provide both RFID tag and RFID reader components integrated with the device, thereby adding cost and complexity.

U.S. Patent Publication No. 2005/0043021 presents time-based identification of a wireless device but requires a network access point that can monitor the device prior to the device joining the PAN network.

U.S. Patent Publication No. 2004/0073795 requires two devices to exchange a password through an out of band process in order to join a network, requiring the ability for the devices to exchange a password.

U.S. Patent Publication No. 2004/0203381 discloses touching two devices together or bringing them into close proximity to cause the devices to attempt to form an association. The method is insecure in that once the device discovers a nearby wireless device a trigger time is not used to confirm that the discovered device is the correct target. Therefore, this method will not work reliably when two PAN users are within range of each other and both want to establish PAN connections.

Therefore it is desirable to provide a method and system for associating devices in a personal area network that is flexible, where it would be simple to associate a device with one PAN at one moment and with a different PAN at some later period in time. Moreover, the method and system should be relatively secure where a user can prevent a co-worker from over hearing a private conversation over the PAN. Additionally, the method and system should provide a quick and easy to build association between wireless devices by eliminating the need to remember and enter PINs and passcodes or to re-program PINs or passcodes to build the association.

BRIEF DESCRIPTION OF THE FIGURES

The accompanying figures where like reference numerals refer to identical or functionally similar elements throughout the separate views and which together with the detailed description below are incorporated in and form part of the specification, serving to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

FIG. 1 illustrates the problems encountered in associating a wireless device to the proper personal area network when other devices are in range.

Figure 1:
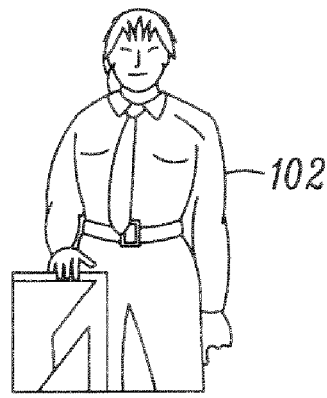
FIG. 1 illustrates two users each having a personal area network including wireless electronic devices adapted to communicate over the network.
Figure 1:
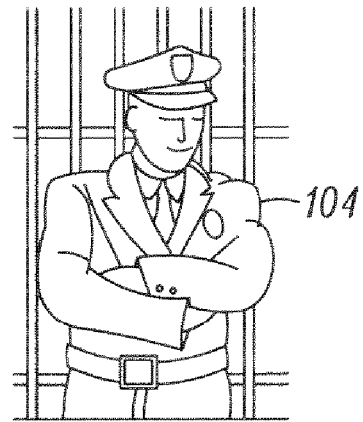
Figure 1:
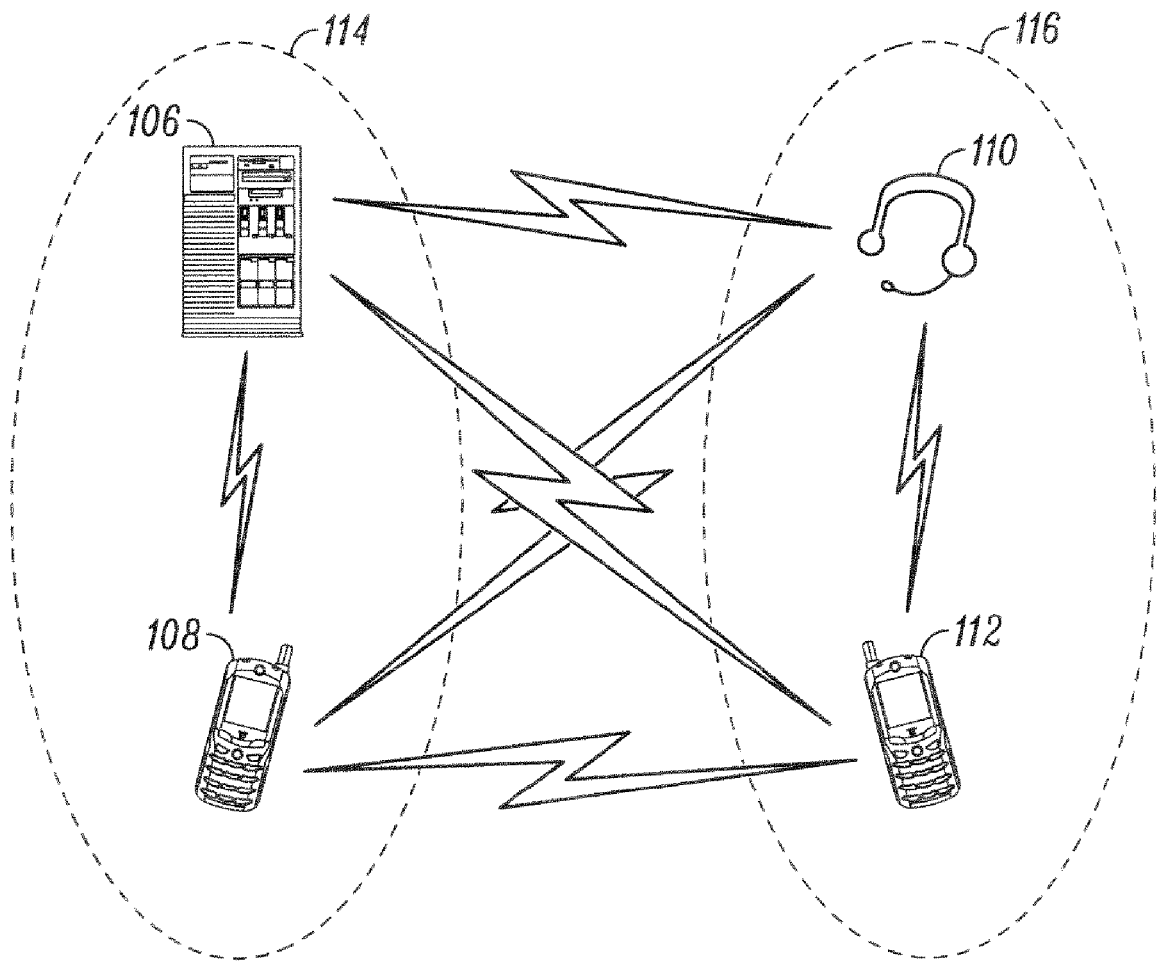

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and system components related to a method and system for associating devices in a personal area network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a method and system for associating devices in a personal area network as described herein. The non-processor circuits may include, but are not limited to, a radio receiver, a radio transmitter, signal drivers, clock circuits, power source circuits, and user input devices. As such, these functions may be interpreted as steps of a method to perform a method and system for associating devices in a personal area network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the specification concludes with claims defining the features of the invention regarded as novel, it is believed that the invention will be better understood from a consideration of the following description.

The invention as described herein relates to electronic devices such as cellular phones, mobile radios, PDAs and the like which are adapted to communicate with each other or other device accessories such as wireless headsets using one of the short range wireless network technologies also called a personal area network (PAN). Generally, each user may have multiple PAN enabled devices which the user associates to form his or her own PAN. The invention specifically addresses a method and system for associating a new device with the correct PAN in a situation where the device is within range of more than one PAN. The method and system disclosed herein provide a flexible solution that permits a user to easily associate a device with one PAN today, and with a different PAN tomorrow, a feature that is particularly beneficial when devices are shared among many users. The present invention overcomes limitations of known methods of associating devices into a PAN by removing the need to reprogram the device, or enter a PIN, especially on a device such as a headphone that lacks a display and keypad. In accordance with the present inventive disclosures herein each PAN device is equipped with an input mechanism that allows the user to apply a stimulus to two PAN devices simultaneously. The stimulus indicates to the devices that they should attempt to join a PAN. Various input mechanisms could be used, as long as the stimulus is easy for the user to apply. For example, when two devices are attempting to join a PAN, applying a the stimulus can include providing a speech detector on each device such that when a user speaks a keyword while in audible range of the two devices, a stimulus is provided. In another example, applying the stimulus can include providing a tone generator on one device and a matching tone detector on the other device such that actuating a tone generator provides the stimulus. In yet another example, applying a stimulus can include providing a button actuated switch on each device, and pressing the button to provide the stimulus. In accordance with the present invention each PAN device is equipped with a clock and each device notes the time at which the stimulus is applied. When the stimulus is applied the two devices are not yet associated with each other, so the clocks on the devices may not be synchronized. This does not matter; the devices only need to keep track of the relative time or specifically the elapsed time since the stimulus was detected. After the stimulus is applied, the two devices start looking for other in-range PAN devices with which to potentially associate. The details of the search depend on the specific PAN technology, for example using either a BLUETOOTH protocol or ZIGBEE protocol. Searching for other in-range devices could take several seconds and other nearby devices could also be attempting to join another PAN. However, the other nearby devices would not have received a stimulus at the same time as the two devices that the user is seeking to pair. Once one of the devices (A) locates another device (B) with which it could potentially associate, device A sends a message to device B containing the amount of time since the stimulus was applied to device A. Device B compares that time with the amount of time since device B received a stimulus. If the two times substantially agree the two devices will associate with each other. If the times do not agree, the devices will not associate with each other and will resume looking for other devices with which to associate.

Referring now to FIG. 1, FIG. 1 illustrates one motivation for the invention disclosed herein. A Personal Area Network (PAN) is defined herein to consist of 2 or more devices wirelessly communicating with each other over a short distance, in some cases 10 meters or less. PAN devices are often mobile devices such as radios, cell phones, head phones, laptops, sensors, and PDAs. The range of an individual PAN is limited, but if multiple PAN users are in the same room, the coverage areas of the PANs will overlap and other PAN devices may be in range that the user does not wish to associate into their PAN. In the illustrated example PAN users 102 and 104 are depicted in FIG. 1. PAN user 102 has a PAN 114 in which she would like to associate the personal digital assistant 106 with the mobile phone or mobile radio 108, while user 104 has a PAN 116 in which he would like to associate the headphone device 110 with the mobile radio or cellular phone 112. When device 106 starts searching for another PAN device, the present invention prevents device 106 from accidentally associating with device 112 instead of device 108.

Figure 2:
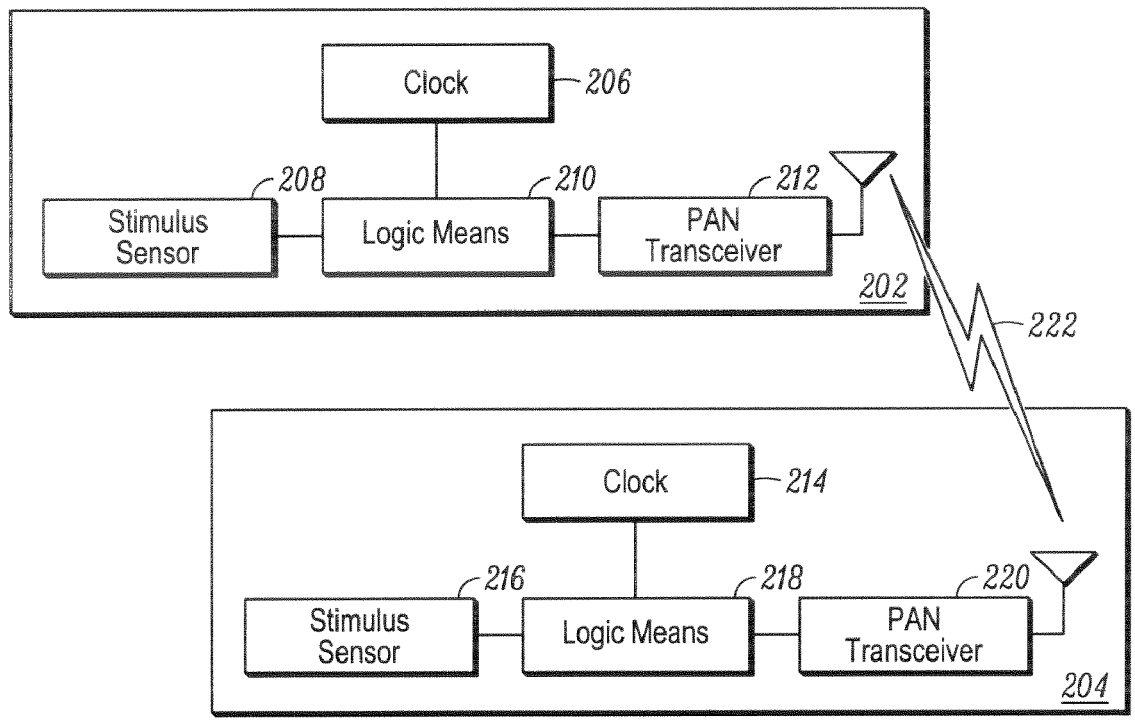
FIG. 2 is a block diagram of two electronic devices adapted to communicate in a personal area network depicting essential features in accordance with an embodiment of the invention presented herein.

FIG. 2 illustrates a block diagram of two PAN devices adapted to communicate in a personal area network, each device having features for associating with other PAN devices in accordance with the disclosures herein. Electronic devices 202 and 204 include at least the elements illustrated. Each PAN device 202 and 204 is equipped with an input mechanism in the form of a stimulus sensor 208 and 216 that allows a user to apply a stimulus to the two PAN devices 202 and 204 simultaneously. The stimulus input indicates to the devices that they should attempt to join a PAN and hence begin to search for other devices that may be in range. The stimulus sensor could be any of a variety of input mechanisms that permit the user to easily apply a simultaneous stimulus to both devices 202 and 204. Varieties of suitable stimulus sensors include, but are not limited to, an accelerometer so that users could simultaneously shake the devices or tap them together, a speech detector so that a user can speak a keyword in the audible range of the devices to provide the stimulus, a tone generator secured in at least one PAN device and a matching tone generator secured in at least one other PAN device where actuating a tone generator provides the stimulus, a button actuated switch secured in each PAN device so that pressing the button can provide the stimulus, a permanent magnet and magnetic field sensor secured in each PAN device such that a user could pass the PAN devices close to each other to apply the stimulus. Suitable magnetic field sensors include reed switches and Hall Effect sensors such as those disclosed in U.S. Patent Publication No. 2004/0203381 to Cahn et al. and assigned to Motorola, Inc. Hall Effect sensors generate an electrical signal when subject to a magnetic field. A reed switch is an electrical switch that can be caused to change state from open to closed contacts or close to open contacts when exposed to a magnetic field. The presence of the applied stimulus at the stimulus sensors 208, 216 is presented to the logic means 210, 218 of devices 202, 204. The logic means comprises a microprocessor, memory and programmed logic executable on the microprocessor. Upon detecting the stimulus the logic means 210, 218 interacts with the PAN transceiver 212, 220 such that each device 202, 204 may search for and identify other PAN devices in range with which to potentially associate. The logic means of each PAN device has access to a clock 206, 214 which measures the passage of time. The clock 206, 214 is used by the logic means to measure elapsed time from the time the stimulus was detected. The PAN devices 202, 204 identify other PAN devices with which to associate by comparing the amount of time elapsed since the stimulus against the elapsed time reported by other PAN devices wherein two devices may potentially associate if the times agree within a small margin of error.

Figure 3:
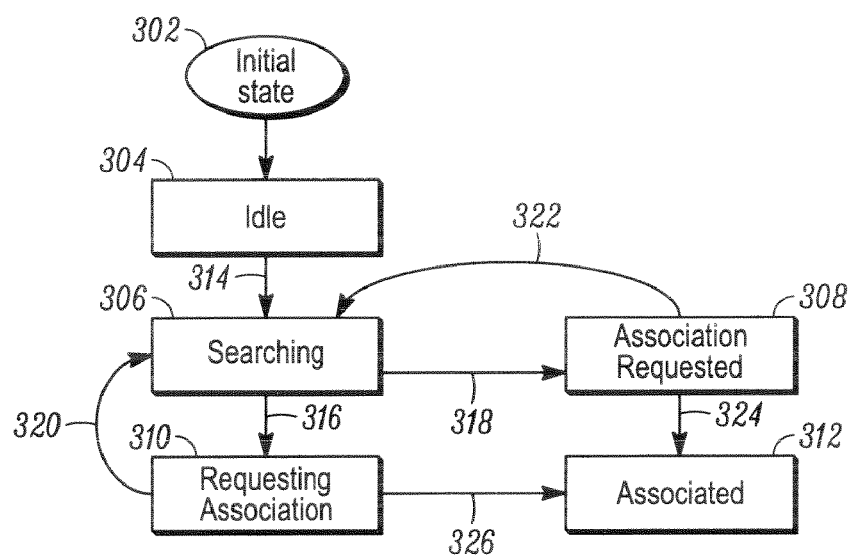
FIG. 3 is a diagram depicting a PAN association state chart of a method for associating with a trusted device in accordance with an embodiment of the invention presented herein.

FIG. 3 is a diagram depicting a PAN association state chart of a method for associating with a trusted device in accordance with an embodiment of the invention presented herein. Two PAN devices will be distinguished herein as the first device and the in-range device for clarity. The depicted state chart applies to both the first device and to the in-range device. The first PAN device and the in-range device both start (after power on at 302) in an idle state 304 wherein both devices lack a shared PAN association. When a stimulus is applied to both the first and in-range devices, each device records the current time, or at least starts to measure elapsed time and transition along 314 to state block 306 where the stimulated PAN devices initiate a search for other PAN devices with which to potentially associate. For discussion purposes herein, we assume the first device locates the in-range PAN device. The state of the first device then transitions along 316 where the first device sends an association request to the in-range PAN device. The association request includes the elapsed time since the stimulus was applied to the first device. The state of the first device is now at block 310. When the in-range device receives the association request it transitions along 318 to block 308. The in-range device compares the elapsed time from the association request against the elapsed time since the in-range device detected the stimulus. If the elapsed times are within a limit, for example 200 ms, then the association is accepted, otherwise it is rejected. If the in-range device rejects the association request, then the in-range device transitions along 322 to state block 306 where the in-range resumes searching for other in-range PAN devices to associate with. Upon detecting rejection of the association request, the first device transitions along 320 to block 306 where the first device resumes searching for other in-range PAN devices to associate with. If instead at block 308 the association request is accepted by the in-range device, then the state of the in-range device transitions along 324 to state block 312 and the state of the first device transitions along 326 to state block 312 where both the first and in-range devices associate to join a PAN. If the stimulated devices fail to find a PAN device to associate with within a defined search time, then the devices can cease searching 306 and return to the idle state 304 to conserve power. To avoid confusion this transition is not shown in this and subsequent diagrams.

Another variation of the method presented in the state chart of FIG. 3 is also envisioned. In this variation, after the first device locates the in-range device, in transitioning along 316 to state block 310 the first device and the in-range devices form a temporary association and then exchange elapsed times. As discussed above, if the elapsed times agree within a limit then the temporary association is converted to a permanent association, otherwise the temporary association is terminated. One advantage of this approach is that the messages used to elapse times and to preserve or terminate the association could be application-level messages rather than being built into lower level BLUETOOTH or ZIGBEE signaling messages. This permits the method to be implemented using off-the-shelf BLUETOOTH or ZIGBEE modems without making any changes to the modem or network protocol stack, all the messages and logic to preserve or break the association could be above the BLUETOOTH or ZIGBEE protocol stack at the application level. A disadvantage of exchanging elapsed times at the application level is that there could be a significantly longer time delay between when the message is sent and when it is received by an application. This means the time check or limit threshold would need to be larger.

Figure 4:
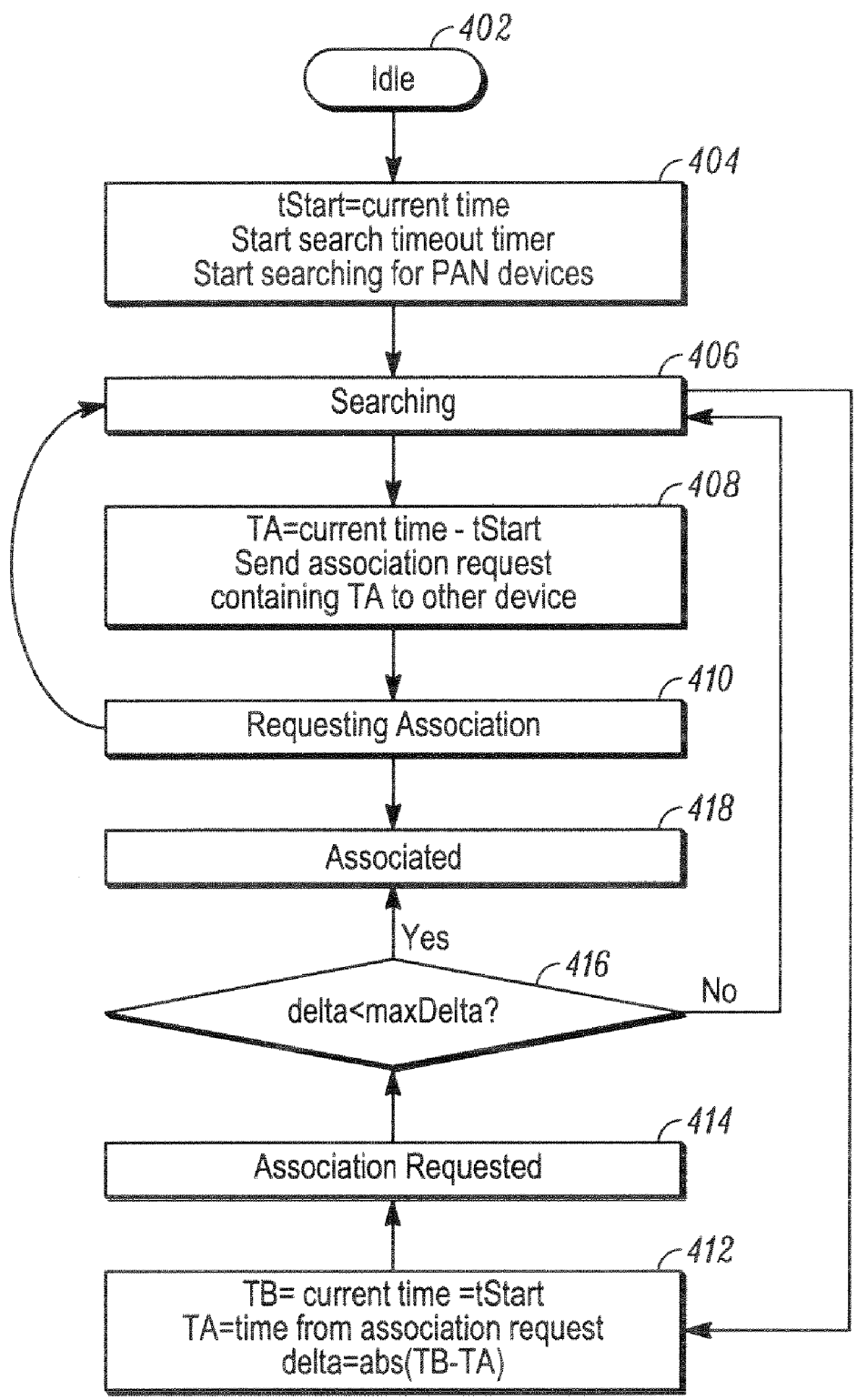
FIG. 4 is a flow chart of a method of building a PAN association between two trusted devices in accordance with an embodiment of the invention presented herein.

FIG. 4 is a flow chart of a method of building a PAN association between two trusted PAN devices in accordance with an embodiment of the invention presented herein. Two PAN devices will be distinguished herein as the first device and the in-range device for clarity. The depicted flow chart applies to both the first device and to the in-range device. The first PAN device and the in-range device both start (after power on) in an idle state 402 wherein both devices lack a shared PAN association. When a stimulus is applied to both the first and in-range devices, control then transfers to block 404 where the first and in-range devices each record the current time (tStart) and start the search timeout timer. Control is then transferred to block 406 with both devices entering the searching state where each device searches for PAN devices with which to potentially associate. For discussion purposes herein, we assume the first device locates the in-range PAN device. When the first device locates an in-range PAN device, control transfers to block 408 where the elapsed time (TA) since the first device received the stimulus is calculated by subtracting the time the stimulus was detected from the current time. Control then transfers to block 410 with the first device entering the requesting association state where an association request message is then sent to the in-range PAN device. The association request includes the elapsed time (TA) since the stimulus was applied to the first device. The in-range device, upon receiving the association request message, transfers control from block 406 to block 412. At block 412 the in-range device calculates the elapsed time (TB) as the time the stimulus was detected by the in-range device subtracted from the current time. Still at 412, the in-range device receives the elapsed time (TA) from the first device in the association request message (see blocks 408 and 410). At block 412 the in-range device then calculates a time difference (delta) between the elapsed times (TA) and (TB). The in-range device then transitions to the association requested state at block 414. At block 416 the in-range device compares the elapsed time from the association request against the elapsed time since the in-range device detected the stimulus. If the elapsed times reported by the first device and the in range device differ by more than a defined maximum (maxDelta), then the devices did not simultaneously receive the stimulus and the association is rejected. If the elapsed times reported by the first device and the in-range device differ by less than a defined maximum (maxDelta), then the devices did simultaneously receive the stimulus and the association is accepted. If the in-range device rejects the association, then control transfers from block 416 back to block 406 where the in-range device returns to the searching state and resumes searching for other in-range PAN devices. Upon detecting rejection of the association request, the first device transitions from block 410 back to block 406 where the first device resumes searching for other in-range PAN devices to associate with. If instead at block 416 the in-range device accepts the association request, then the in-range device notifies the first device and transitions from block 416 to block 418. Upon receiving the notification the first device transitions from block 410 to block 418 where both the first and in-range devices associate to join a PAN. If instead the stimulated devices fail to find a PAN device to associate with within a defined search time, then the devices can cease searching 406 and return to the idle state 402 to conserve power. To avoid confusion this transition is not shown.

In summary, in the case of associating trusted devices A and B, the steps can be summarized into three events: Event 1—A stimulus is simultaneously applied to devices A and B. Each device records the relative time at which the stimulus is received. The devices start to search for other devices with which they can associate. Event 2—After device A locates device B it sends an association request message containing the elapsed time since the stimulus was received by device A. Event 3—When device B receives the association request message, it compares the elapsed time since device B received the stimulus with the elapsed time reported in the association request message. If the elapsed times agree to within a threshold, for a non-limiting example 200 msec, device B will accept the association request. If the elapsed times do not agree, device B will reject the request.

A threshold comparison is used instead of checking for an exact match of elapsed times because there are several sources of potential timing differences:

(a) The stimulus may not be detected by both devices at exactly the same time.

(b) There may be drift in the clocks used to measure relative time on the 2 devices.

(c) Some amount of time is needed for device B to receive and process the association request message after it is sent by device A.

The disclosed methods in FIG. 3 and FIG. 4 are appropriate for associating trusted devices. In the case of untrusted devices, however, the method has a weakness in that the decision to associate is made by the device receiving the association request message and the decision to associate is not verified by the device sending the association request. The device receiving the association request can potentially be a black hat device that accepts association requests without regard to the difference in elapsed stimulus times and can thereby associate itself with PANs where there was no user intent to associate the devices. A more secure method for creating associations between untrusted devices in a PAN is presented in FIG. 5 and FIG. 6 and the discussions of those figures below.

Figure 5:
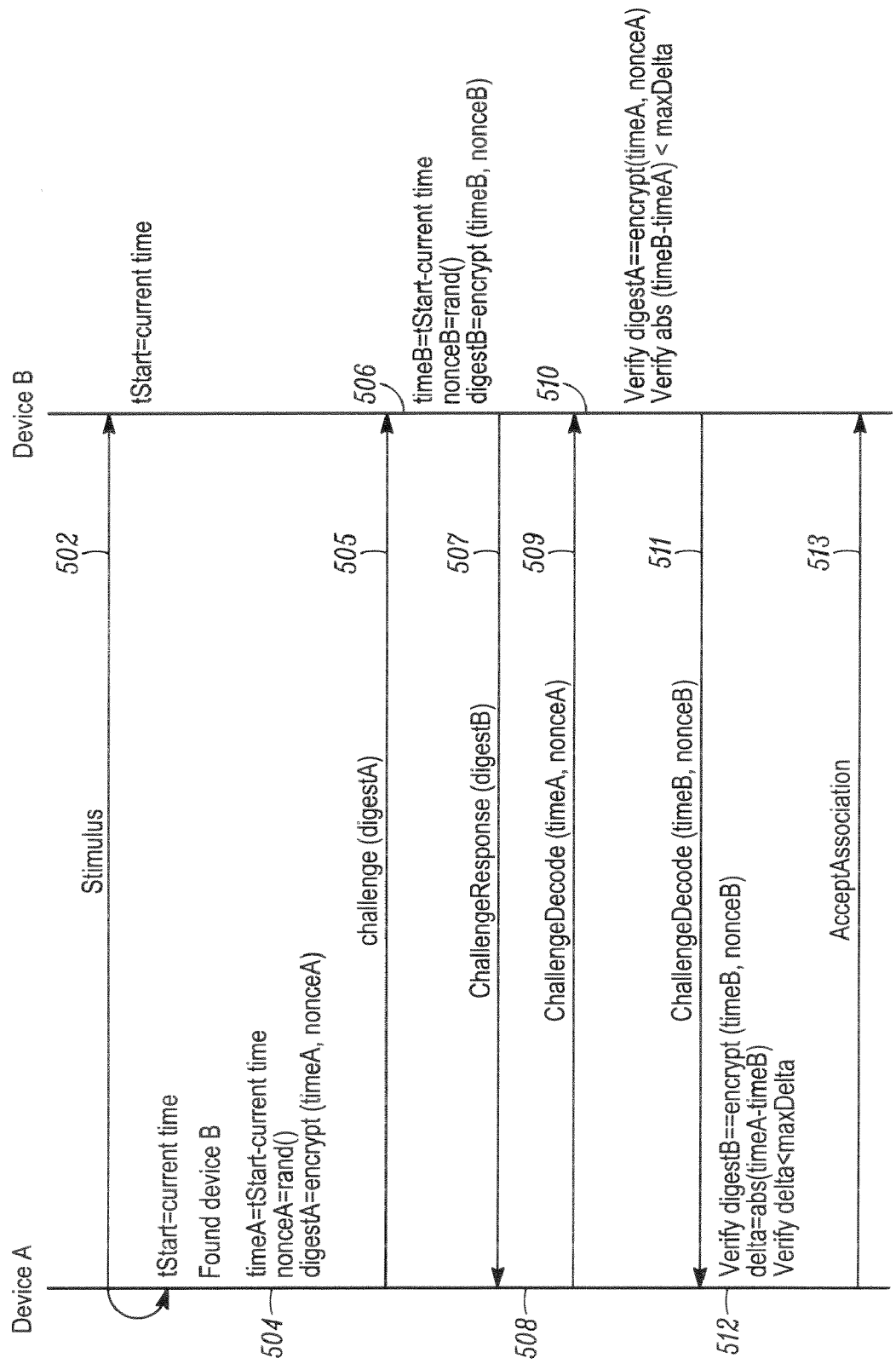
FIG. 5 is a message flow diagram illustrating a successful association using the method described in more detail in FIG. 6 in accordance with an embodiment of the invention presented herein.

FIG. 5 is a message flow diagram illustrating a successful association using the method described later below in the detailed discussion of FIG. 6. FIG. 5 is discussed before FIG. 6 as FIG. 5 gently introduces the concepts of associating untrusted devices while temporarily avoiding the heavier detail of FIG. 6. Two PAN devices will be distinguished in the discussion that follows as device A and device B. In FIG. 5 device A is the initiator of the association request and sends the initial challenge to device B. The message flow begins at 502 with a stimulus applied to device A and a stimulus applied to device B causing both devices to record the current time that the stimulus was detected. At 504 device A finds device B on the short range network. Upon finding device B device A calculates the time elapsed since the stimulus was detected (timeA) and generates a random nonce (nonceA). (timeA) is encrypted using (nonceA) to produce (digestA) which is a one way encryption of (timeA). At 505 device A then sends a challenge message containing (digestA) to device B. At 506 device B receives (digestA) and calculates the time elapsed since the stimulus was detected (timeB) and generates a random nonce (nonceB). (timeB) is then encrypted using (nonceB) to produce (digestB). Device B then sends a challenge response message 507 containing (digestB) to device A. At 508 both devices have now received the other device's encrypted elapsed times as a digest, so both devices can now safely reveal their unencrypted elapsed time values. At 509 device A sends a challenge decode message to device B containing (timeA) and (nonceA). At 510 device B verifies that the (timeA) it received is valid by encrypting (timeA) using (nonceA) and comparing the result to the (digestA) received earlier. If (timeA) is valid, then device B compares (timeA) to (timeB) to determine if they are close within a defined margin of error. If they are close, then device B sends a challenge decode message 511 containing (timeB) and (nonceB) to device A. At 512 when device A receives (timeB) and (nonceB) device A then verifies that timeB is valid by encrypting (timeB) using (nonceB) and comparing to the previously received (digestB) which if (timeB) is valid should exactly match. If (timeB) is valid, then device A compares (timeA) to (timeB) to test if the elapsed times are close within a defined margin of error. If the elapsed times are close then device A sends an accept association message 513 to device B and devices A and B joining a PAN.

Another variation of the method presented in the message flow diagram of FIG. 5 is also envisioned. In this variation, after device A locates device B at 504, devices A and B form a temporary association. Then device A proceeds with calculating timeA, nonceA, digestA and sending 505 to device B using the temporary network association. Later at 513 if the digests verify and the unencrypted elapsed times match within the defined limit, then the temporary association is converted to a permanent association, otherwise the temporary association is terminated. One advantage of this approach is that the messages used to elapse times and to preserve or terminate the association could be application level messages rather than being built into lower level BLUETOOTH™ or ZIGBEE™ signaling messages. A disadvantage of exchanging elapsed times at the application level is that there could be a significantly longer time delay between when the message is sent and when it is received by an application. This means the time check or limit threshold would need to be larger.

Figure 6B:
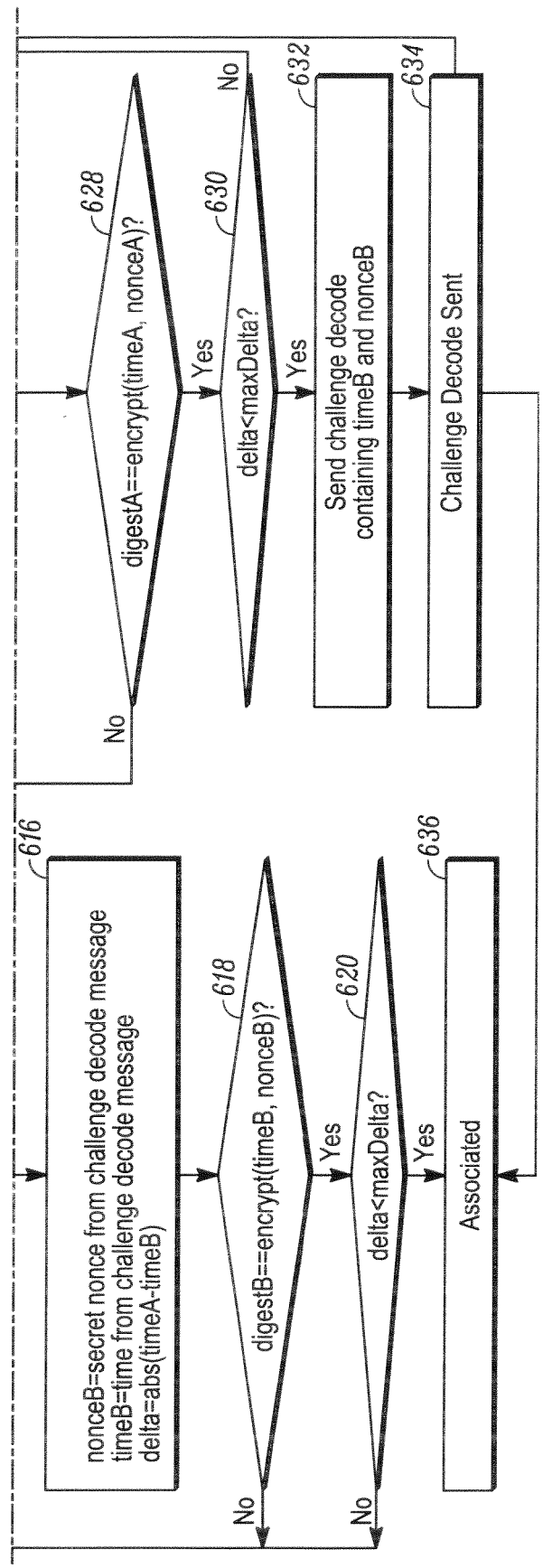
FIG. 6 is a flow chart of a method of associating untrusted devices in accordance with an embodiment of the invention presented herein.

FIG. 6 is a flow chart of a method of associating untrusted devices in accordance with an embodiment of the invention presented herein. Two PAN devices will be distinguished in the discussion that follows as device A and device B. When powered on, devices A and B enter an idle state 602 where they are not yet associated in a PAN. When a stimulus is applied to devices A and B, each device receiving the stimulus transfers control to 604 where each stimulated device records the current time (tStart), then transfers to block 606 with each device entering the searching state to search for PAN devices with which to potentially associate.

The left side of the flow diagram blocks 608, 610, 612, 614, 616, 618 and 620 are executed when the diagrammed device is the initiator of the association request.

The right side of the flow diagram blocks 622, 624, 626, 628, 630, 632 and 634 are executed when the diagrammed device is not the initiator of the association request.

When device A as illustrated in FIG. 6 is the initiator of the association request: Device A is in the searching state, block 606. When device A locates an in-range PAN device, control transfers to block 608 where the elapsed time (timeA) since device A received the stimulus is calculated by subtracting the time the stimulus was detected from the current time (tStart). A secret random nonce (nonceA) is then generated, where a nonce can be a random number. A one way encryption is then performed on the elapsed time (timeA) using the (nonceA) to produce (digestA). A digest is a fixed length string produced by the encryption function. In the encryption function the nonce may be used as an encryption key or the nonce may be appended or numerically added to the first argument (timeA) during encryption to generate digestA. Device A then sends a challenge message containing (digestA) to device B. Control then transfers to block 610 where device A waits for a response to its challenge message. At block 612 device B replies with a challenge response message having (digestB) which is calculated by device B in a similar fashion to (digestA) above. Both devices have now received a digest from the other device. Device A then sends a challenge decode message containing (timeA) and (nonceA) to device B. Control transfer to block 614 to wait for the challenge decode message from device B. When the challenge decode message is received, control then transfers to block 616. The challenge decode message from device B contains the elapsed time (timeB) and secret nonce as generated by device B (nonceB). Device A then calculates (delta) as the difference in time between elapsed times (timeA) and (timeB). To verify that the received (timeB) is valid, device A encrypts (timeB) and the (nonceB) and compares the result to the (digestB) received earlier at block 610. The values should exactly match if the (timeB) provided is correct. If (delta) is not less than (maxDelta), then the elapsed times do not match and control transfers to block 602 returning device A to the idle state. Otherwise at block 620 (delta) is compared to a defined maximum acceptable elapsed time value (maxDelta) to see if the elapsed times recorded on device A and device B substantially match. If (delta) is less than (maxDelta), then the elapsed times substantially match and control transfers to block 636 with device A and device B joining a PAN.

When device A as illustrated in FIG. 6 is not the initiator of the association request: Device A is in the searching state, block 606. When the device A receives a challenge message from device B, control transfers to block 622 where the elapsed time (timeB) since device A received the stimulus is calculated by subtracting the time the stimulus was detected from the current time (tStart). A secret random nonce (nonceB) is then generated, where a nonce can be a random number. A one way encryption is then performed on the elapsed time (timeB) using the (nonceB) to produce (digestB). A digest is a fixed length string produced by the encryption function. In the encryption function the nonce may be used as an encryption key or the nonce may be appended or numerically added to the first argument (timeB) during encryption to generate digestB. Device A then sends a challenge response message containing (digestB) to device B. Control then transfers to block 624 to wait for the challenge decode message from device B. When the challenge decode message is received, control transfer to block 626. The challenge decode message contains (timeA) and (nonceA) from device B. At block 626 device A calculates the difference (delta) in the elapsed times since stimulus applied as measured by device A and device B. If a simultaneous stimulus was applied to both devices, then ideally (delta) should be zero or indicate that the elapsed times are substantially the same, for example within 200 ms, as discussed earlier. At block 628 device A encrypts (timeA) using (nonceA) and compares the result to the (digestA) received earlier in the challenge message and shown in block 622. The values should exactly match if the (timeA) provided is correct. If the values do not match transfers to block 606 returning device A to the searching state, otherwise at block 630 (delta) is compared to a defined maximum acceptable elapsed time value (maxDelta) to see if the elapsed times recorded on device A and device B substantially match. If (delta) is not less than (maxDelta), then the elapsed times do not match and control transfers to block 606 returning device A to the searching state. If (delta) is less than (maxDelta) then the elapsed times substantially match and control transfers to block 632. At block 632 a challenge decode message containing (timeB) and (nonceB) is sent to device B, device B enters the challenge decode sent state at block 634 and device A waits for an accept association message. When the accept association message is received, control transfers to block 636 with device A and device B joining a PAN. If at block 634 the association is not accepted by device A, then control transfers to block 602 with device A returning to the idle state.

Accordingly, there has been provided a system and method of associating electronic devices in a wireless network. The invention is incorporated into PAN enabled electronic devices including mobile or cellular phones, mobile radios, wireless headphones, hands-free earpiece and microphone sets, personal digital assistants and other devices. The methods and system of the present invention are more flexible than conventional methods of associating devices in which an identification code is preprogrammed into the device. Known methods of associating electronic devices into a PAN require users to enter PIN codes on device keypads to authenticate the PAN association. Using the methods of the present invention the PAN configuration can be changed dynamically without reconfiguring the devices. The methods of the present invention are easier to use than the conventional approach in which the user must enter an identification number into one or more devices. This is especially true for small devices such as an ear bud speaker or a small sensor which can not support a numeric input device such as a keypad. The novel inventive information exchange approach presented herein allows two untrusted devices to exchange validation information (the time since the stimulus was detected) in such a way that neither device can read the information until the exchange is complete. This allows the devices to avoid associating with an unauthorized device that did not receive the stimulus.

The methods and system disclosed herein are particularly useful when a PAN user wants to associate two PAN devices with each other, and the user is potentially in range of other PAN devices with which the user does not want to associate. This happens, for example, in work situations, office situations and public places. An example from the public safety domain is a police officer is equipped with a radio and various wireless accessories such as a head set, a device for writing citations, a gun withdrawal sensor, bio-monitoring sensors, etc. Some of these devices may be permanently assigned to the officer, others might be shared by multiple users. When multiple officers pick up and turn on PAN devices at the beginning of a work shift, the devices that will be carried by a specific officer must associate with that officer's PAN and not with the PAN of some other nearby officer. Another example from a consumer domain is a cell phone user who purchases a wireless head phone and wants to associate the head phone with his or her cell phone while standing near several other cell phone users.

The disclosure above refers to various messages such as "association request", "association accepted", "association rejected", "Challenge", "Challenge response" and "Challenge decode." It is to be understood that these messages are non-limiting examples only and do not refer to specific messages in a particular PAN protocol such as BLUETOOTH or ZIGBEE. The messages could be implemented by adding new messages to an existing protocol, or by piggybacking on existing messages. It is to be understood that there may not be a one to one mapping between the example messages in the disclosure and the implementation messages. For example, the elapsed time and nonce in a challenge decode could conceivably be sent in two separate implementation messages.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method of associating electronic wireless devices in a personal area network comprising:

providing at least a first and a second wireless electronic device adapted to communicate over the network, wherein the at least first and second devices are in range;

applying a stimulus to the first and second devices, wherein the devices receiving the stimulus note the time the stimulus was applied;

searching the network for in-range devices by at least the first device;

identifying at least the second device in the search conducted by the first device;

calculating, by the first device, the elapsed time since the stimulus was applied to the first device;

transmitting the elapsed time from the first device to the second device;

receiving the elapsed time at the second device;

comparing, by the second device, the elapsed time of the second device to the received elapsed time of the first device; and associating the first device with the second device if the elapsed time of the second device matches the received elapsed time of the first device within a defined time limit.

2. The method as recited in claim 1, wherein:

the identifying step includes forming a temporary association between the first and second devices; and wherein:

the step of associating the first device with the second device includes converting the temporary association to a permanent association if the elapsed times match within the defined time limit, otherwise terminating the temporary association.

3. The method as recited in claim 1, wherein the step of applying the stimulus includes actuating an accelerometer sensor by moving the device, wherein moving the device as sensed by the accelerometer provides the stimulus.

4. The method as recited in claim 1, wherein the step of applying the stimulus includes passing the first and second devices proximate to each other, where each device has a magnet and a magnetic field sensor, wherein sensing the magnetic field provides the stimulus.

5. The method as recited in claim 1, wherein the step of applying the stimulus includes providing a button actuated switch on each device, wherein pressing the button provides the stimulus.

6. The method as recited in claim 1, wherein the step of applying the stimulus includes providing a speech detector on each device, wherein the user speaks a keyword while in audible range of at the least two devices to provide the stimulus.

7. The method as recited in claim 1, wherein the step of applying the stimulus includes a tone generator on one device and a matching tone detector on the other device, wherein actuating a tone generator provides the stimulus.

8. The method of claim 1 wherein the personal area network is a BLUETOOTH or ZIGBEE network.

9. A method of associating untrusted electronic wireless devices in a personal area network comprising:

providing at least two electronic wireless devices where one is the first device, the at least two devices adapted to communicate over the network, wherein the at least two devices are in range to communicate;

applying a stimulus to at least two devices, wherein one of the devices receiving the stimulus is the first device, wherein the devices receiving the stimulus note the time the stimulus was applied;

searching the network for in-range devices by devices receiving the applied stimulus;

identifying at least one in-range device by the first device;

calculating an elapsed time timeA since the stimulus was applied in the first device;

generating a random number nonceA by the first device;

encrypting the elapsed time timeA using the random number nonceA to produce a string digestA by the first device;

transmitting the string digestA to the in-range device;

receiving the string digestA at the in-range device;

calculating an elapsed time timeB since the stimulus was applied by the in-range device;

generating a random number nonceB by the in-range device;

encrypting the elapsed time timeB using the random number nonceB to produce a string digestB by the in-range device;

sending the string digestB to the first device by the in-range device;

receiving the string digestB by the first device;

transmitting the elapsed time timeA and the random number nonceA to the in-range device by the first device;

receiving the elapsed time timeA and the random number nonceA by the in-range device;

encrypting the elapsed time timeA using the random number nonceA to produce a string digest2 by the in-range device;

comparing the string digest2 to the string digestA, if the string digest2 does not match the string digestA then continuing at the searching step;

comparing the elapsed time timeA to the elapsed time timeB by the in-range device, if the elapsed timeA differs from the elapsed time timeB by more than a configured limit, then continuing at the searching step;

transmitting the elapsed time timeB and the random number nonceB to the first device by the in-range device;

receiving the elapsed time timeB and the random number nonceB by the first device;

encrypting the elapsed time timeB using the random number nonceB to produce a string digest3 by the first device;

comparing the string digest3 to the string digestB, if the string digest3 does not match the string digestB then ending the method; and comparing the elapsed time timeA to the elapsed time timeB by the first device, if the elapsed time timeA differs from the elapsed time timeB by no more than a configured limit, then forming an association between the first device and the in-range device.

10. The method of claim 9 wherein:

the identifying step includes forming a temporary association between the first device and the in-range device;

wherein the step of comparing the string digest2 to the string digest A then continuing at the searching step includes terminating the temporary association;

wherein the step of comparing the elapsed time timeA to the elapsed time timeB by the in-range device then continuing at the searching step includes terminating the temporary association;

wherein the step of comparing the string digest3 to the string digest B, ending the method includes terminating the temporary association; and wherein the step of comparing the elapsed timeA to the elapsed timeB by the first device, forming an association includes converting the temporary association to a permanent association.

11. The method as recited in claim 9, wherein the step of applying the stimulus includes actuating an accelerometer sensor by moving the device, wherein moving the device as sensed by the accelerometer provides the stimulus.

12. The method as recited in claim 9, wherein the step of applying the stimulus includes passing the first and second devices proximate to each other, where each device has a magnet and a magnetic field sensor, wherein sensing the magnetic field provides the stimulus.

13. The method as recited in claim 9, wherein the step of applying the stimulus includes providing a button actuated switch on each device, wherein pressing the button provides the stimulus.

14. The method as recited in claim 9, wherein the step of applying the stimulus includes providing a speech detector on each device, wherein the user speaks a keyword while in audible range of at least two devices to provide the stimulus.

15. The method as recited in claim 9, wherein the step of applying the stimulus includes a tone generator on one device and a matching tone detector on the other device, wherein actuating a tone generator provides the stimulus.

16. The method as recited in claim 9, wherein:

after the applying step the method further includes starting a search timeout timer; and wherein the step of searching the network includes if the search timer has timed out then ending the method.

17. A system for associating two electronic wireless devices over a personal area network, comprising:

a first device and a second device adapted to communicate over the network, each device comprising:

a means for detecting a user stimulus applied to the device;

a clock for tracking an elapsed time since the application of the user stimulus;

a transceiver and associated logic for sending and receiving messages including the tracked elapsed time over the personal area network; and logic for initiating the association of the two wireless devices in response to the applied stimulus and based on a comparison of the tracked elapsed time and the received elapsed time.

18. The system of claim 17 wherein the means for detecting a user stimulus comprises any of:

an accelerometer for detecting sudden movement of the device;

a magnet and a magnetic field sensor on each device for detecting when two devices pass close to one another;

a momentary contact switch operable to apply the stimulus;

a speech detector on each device configured to recognize a key word as the stimulus; and a tone generator on the first device and a matching tone detector on the second device wherein the tone generator applies the stimulus.

19. The system of claim 17 wherein the personal area network comprises either a BLUETOOTH, ZIGBEE or IEEE 802.11 network.

* * * * *